United States Patent [19]

Nakatsuji

[11] Patent Number: 5,296,933

[45] Date of Patent: Mar. 22, 1994

[54] FACSIMILE APPARATUS

[75] Inventor: Etsurou Nakatsuji, Ikoma, Japan

[73] Assignee: Sharp Kabushiki Kaisha, Osaka, Japan

[21] Appl. No.: 931,504

[22] Filed: Aug. 21, 1992

Related U.S. Application Data

[63] Continuation of Ser. No. 522,895, May 14, 1990, abandoned.

[30] Foreign Application Priority Data

May 15, 1989 [JP] Japan .................................. 1-122658

[51] Int. Cl.$^5$ ............................................... H04N 1/00
[52] U.S. Cl. ..................................... 358/400; 355/200
[58] Field of Search ............... 358/400, 401, 406, 409, 358/410, 411, 434, 435, 436, 438, 439, 443, 447, 448, 403, 405, 407, 450; 355/317, 308, 309, 311, 325, 321, 200

[56] References Cited

U.S. PATENT DOCUMENTS

| | | | |
|---|---|---|---|
| 4,113,993 | 9/1978 | Heckman et al. | 358/440 |
| 4,581,656 | 4/1986 | Wada | 358/438 |
| 4,811,111 | 3/1989 | Kurokawa | 358/257 |
| 4,849,816 | 7/1989 | Yoshida | 358/434 |
| 4,970,554 | 11/1990 | Rourke | 355/200 |
| 5,124,748 | 6/1992 | Tanabe et al. | 355/200 |

FOREIGN PATENT DOCUMENTS 63-72258  4/1988  Japan .............................. H04N 1/00

OTHER PUBLICATIONS

English Abstract to publication No. 63-72258–laid open 1 Apr. 1988.

Primary Examiner—Edward L. Coles, Sr.
Assistant Examiner—Jerome Grant, II
Attorney, Agent, or Firm—Nixon & Vanderhye

[57] ABSTRACT

A facsimile apparatus from which paper sheets bearing an index mark is disclosed. The apparatus has: a counter for counting the number of connections between the apparatus and other facsimile apparatuses; an index signal generator for generating an index signal which represents an index mark; and an index mark-position adjuster for determining the position of an index mark in accordance with the number of connections. The image forming unit of the apparatus prints an index mark corresponding to the index signal, on a paper sheet and at a position determined by the index mark-position adjuster.

9 Claims, 5 Drawing Sheets

FACSIMILE APPARATUS

This is a continuation of application Ser. No. 07/522,895, filed May 14, 1990, now abandoned.

BACKGROUND OF THE INVENTION

1. Field of the Invention

This invention relates to a facsimile apparatus for receiving image signals from another facsimile apparatus and forming images corresponding to the received image signals, on image receiving sheets such as paper sheets.

2. Description of the Prior Art

When transmitting images formed on several paper sheets from a facsimile apparatus (sending apparatus) to another facsimile apparatus (receiving apparatus), each of the original sheets are optically scanned one by one so that the images are transformed into electrical signals (image signals) each representing the pixels of the images, and a connection between the two apparatuses is established via a transmission line (hereinafter, communication established by such a connection is referred to as "a unit of communication"). Then, the image signals are transmitted from the sending apparatus to the receiving apparatus. In the receiving apparatus, the transmitted image signals are converted to the images printed on the same number of image receiving sheets or paper sheets. Usually, as shown in FIG. 5, additional data such as a page number PN and the sender's name or facsimile number are marked at the top of each paper sheet P in accordance with the CCITT recommendation. When another unit of communication is performed between the receiving apparatus and the same or other sending apparatus, another set of paper sheets P for the other unit of communication are output from the receiving apparatus.

The use of such a facsimile apparatus is rapidly increasing in offices, shops or the like. Accordingly, the number of paper sheets P output from a facsimile apparatus used in one place is expanded, and there are chances that paper sheets P of different units of communication may intermix in the course of handling the paper sheets or when they happen to drop from a tray of the apparatus and are scattered on a floor. In such a case, the problem is that the page numbers PN printed on paper sheets P cannot be utilized in rearranging in order the paper sheets of each unit of communication, because the page numbers PN are not given consecutively for all units of communication but for each unit of communication. Usually, paper sheets P are identified according to the sender's name or facsimile number printed at the top. Such a practice involves inefficient and bothersome works, and may often cause wrong recognition of some paper sheets, thereby making the subsequent handling of paper sheets difficult.

SUMMARY OF THE INVENTION

The facsimile apparatus of this invention, which overcomes the above-discussed and numerous other disadvantages and deficiencies of the prior art, comprises: at least a signal receiving unit for receiving image signals from other facsimile apparatuses after the completion of connection between said apparatus and one of said other facsimile apparatuses; and an image forming unit for forming images on an image receiving sheet, said images corresponding to said received image signals, and further comprises: a counting means for counting the number of connections between said apparatus and other facsimile apparatuses; an index signal generating means for generating an index signal which represents an index mark; and an index mark-position adjusting means for determining the position of an index mark in accordance with said number of connections; said image forming unit comprises an index mark forming means for forming an index mark corresponding to said index signal, on an image receiving sheet and at a position determined by said index mark-position adjusting means.

In a preferred embodiment, the index mark-adjusting means determines one from a plurality of positions as said determined position.

The facsimile apparatus of this invention comprises: at least a signal receiving unit for receiving image signals from other facsimile apparatuses after the completion of connection between said apparatus and one of said other facsimile apparatuses; and an image forming unit for forming images on an image receiving sheet, said images corresponding to said received image signals, and further comprises: a counting means for counting the number of connections between said apparatus and other facsimile apparatuses; an index signal generating means for generating a plurality of index signals which respectively represent a different index mark; said image forming unit comprises an index mark forming means for forming an index mark corresponding to said index signal, on an image receiving sheet.

In a preferred embodiment, the index mark is formed at a predetermined position of said image receiving sheet.

Thus, the invention described herein makes possible the objectives of:

(1) providing a facsimile apparatus which can output image receiving sheets in such a manner that they can be easily, promptly and accurately classified into units of communication even when they are mixed with each other; and (2) providing a facsimile apparatus which can output image receiving sheets bearing an index mark which identifies the unit of communication.

BRIEF DESCRIPTION OF THE DRAWINGS

This invention may be better understood and its numerous objects and advantages will become apparent to those skilled in the art by reference to the accompanying drawings as follows.

DESCRIPTION OF THE PREFERRED EMBODIMENTS

Figure 1:
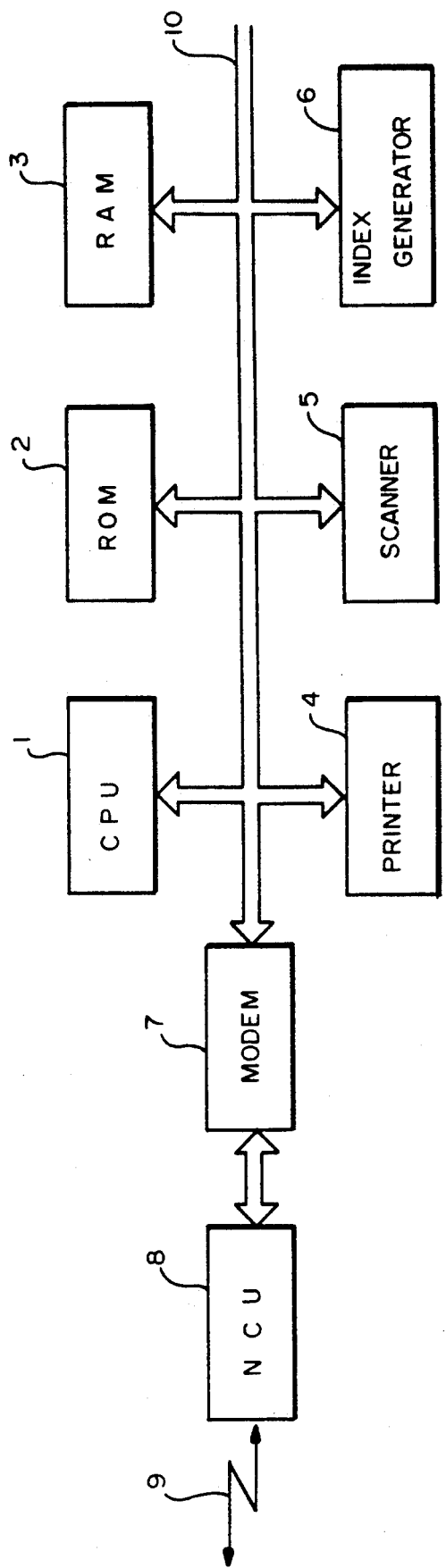
FIG. 1 is a block diagram illustrating an apparatus according to the invention.

FIG. 1 shows diagrammatically a facsimile apparatus according to the invention. The apparatus of FIG. 1 comprises a CPU 1, a ROM 2, a RAM 3, a printer 4 for forming images on paper sheets, a scanner 5 for reading images from an original, an index generator 6, and a modem 7 which are connected to each other through a bus 10. In accordance with a program stored in the ROM 2, which operates in accordance with flow charts illustrated in FIGS. 2A and 2B the CPU 1 controls an image forming unit including the printer 4 and scanner 5, and also other components. The modem 7 modulates and demodulates image signals, and is connected to a public telephone communication line 9 via a network control unit 8. The RAM 3 stores received image signals and an accumulated number of units communication (hereinafter, such a number is referred to as "a communication number").

Figure 3:
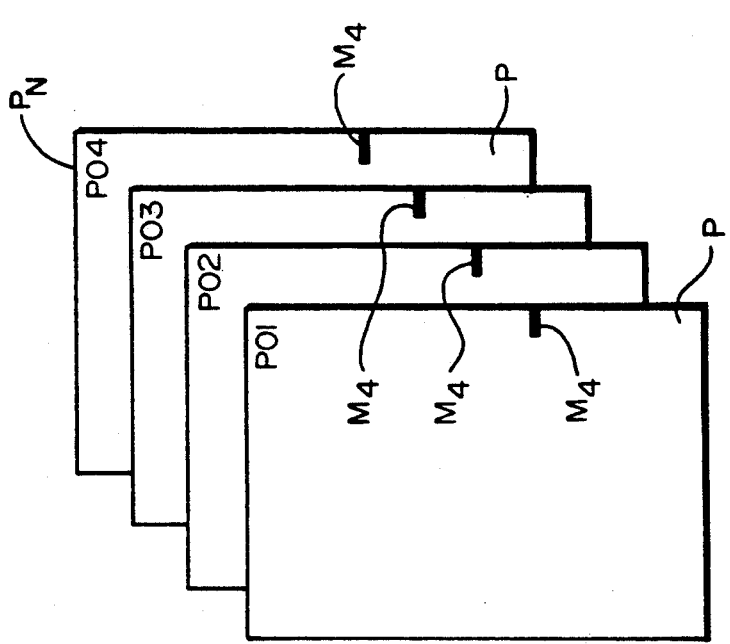
FIGS. 3A and 3B show paper sheets output by the apparatus of FIG. 1.
Figure 3:
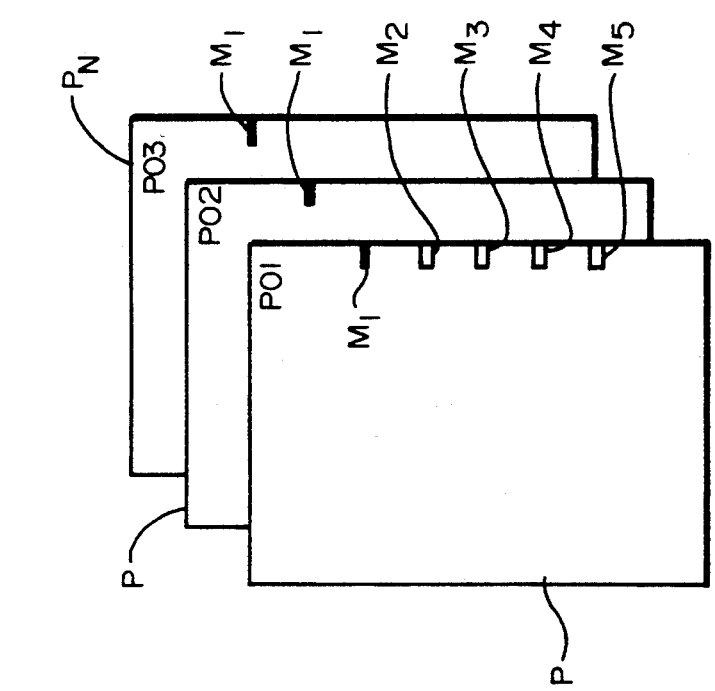

The index generator 6 has a memory in which an index mark to be printed on a paper sheet is stored. In this embodiment, the index mark is a relatively thick rectangular pattern, and printed on the right edge portion of a paper sheet P and at one of five positions M1–M5 as shown in FIG. 3A. The positions M1–M5 are arranged in a row and at regular intervals. The first position M1 is closest to the top of the paper sheet P, but separated therefrom by a predetermined distance. In accordance with the communication number stored in the RAM 3, the CPU 1 selects one of the positions M1–M5. When the communication number is 5n (where n=0, 1, 2, ---), the first position M1 is selected. Similarly, when the communication number is 5n+1, 5n+2, 5n+3, or 5n+4, the position M2, M3, M4, or M5 is respectively selected. This relationship between the communication numbers and the positions M1–M5 is summarized in the following Table 1.

TABLE 1

| Communication number | Position |
| --- | --- |
| 5n | M1 |
| 5n + 1 | M2 |
| 5n + 2 | M3 |
| 5n + 3 | M4 |
| 5n + 4 | M5 |

Figure 2A:
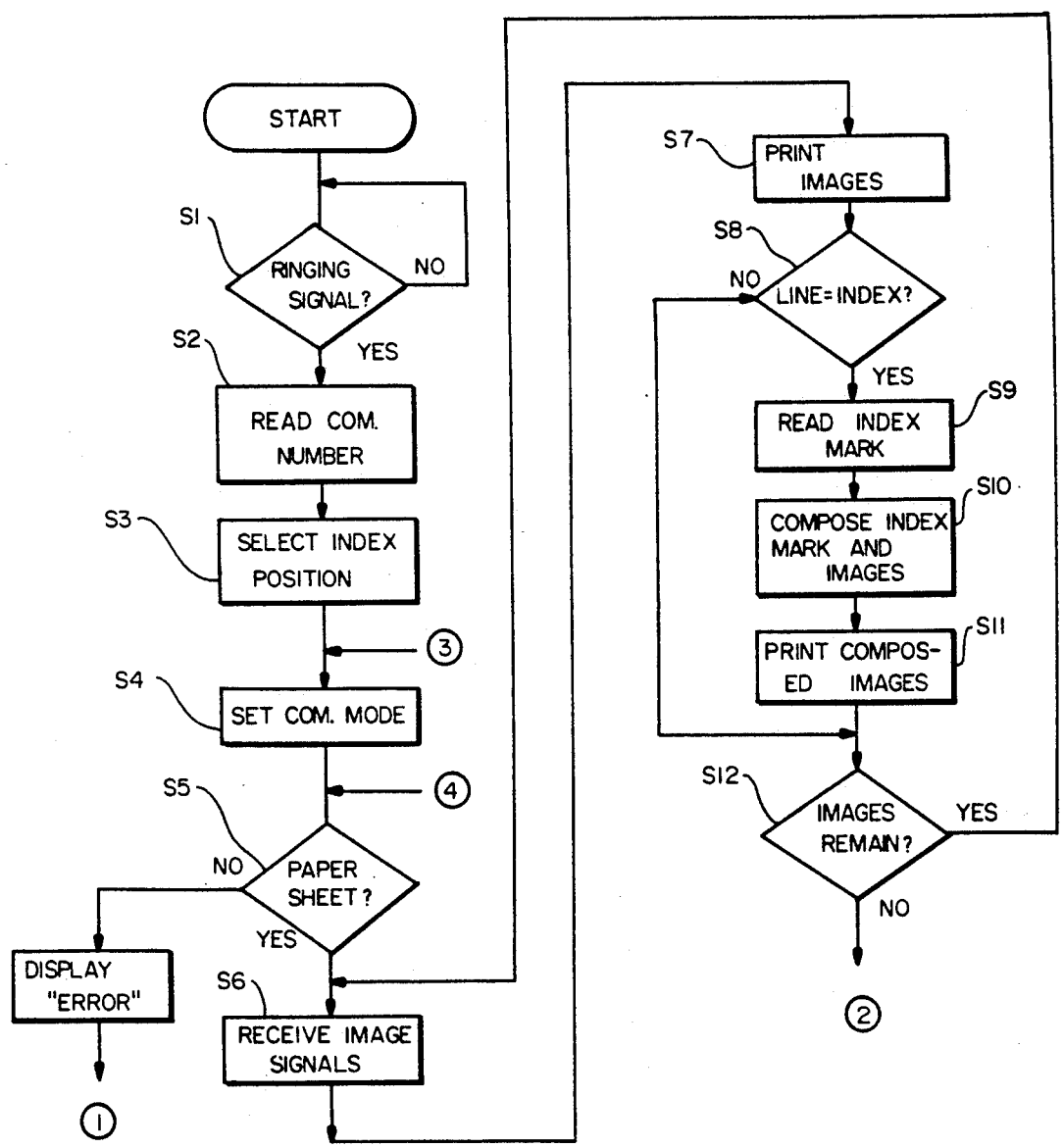
FIGS. 2A and 2B are flow charts illustrating the operation of the apparatus of FIG. 1.
Figure 2B:
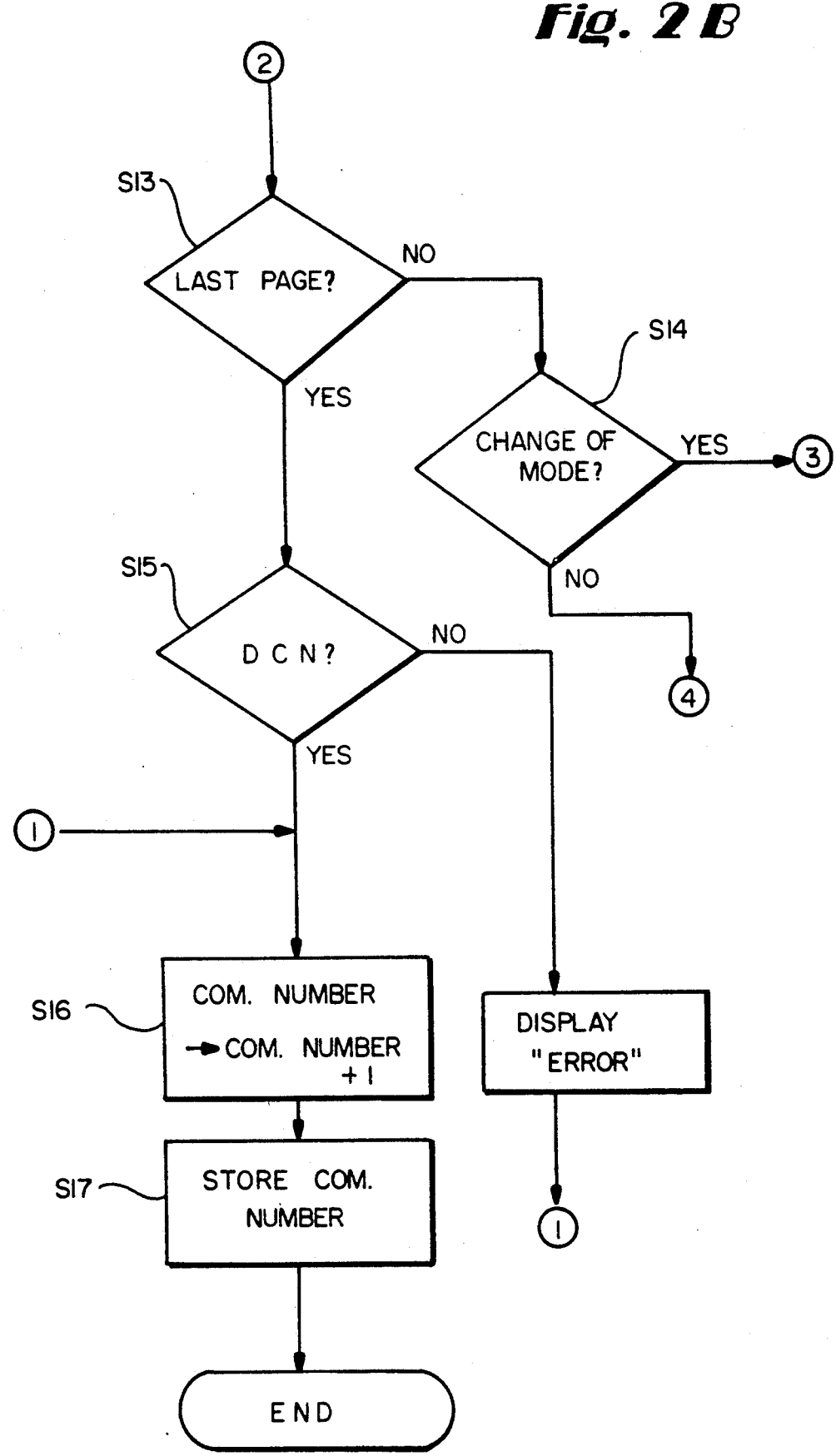

The operation of the facsimile apparatus of FIG. 1 will be described with reference to FIGS. 2A and 2B. The apparatus waits for a ringing signal from another facsimile apparatus (step S1). When receiving a ringing signal, the CPU 1 reads the RAM 3 to read the communication number stored therein (step S2). In accordance with the communication number, one of the positions M1–M5 is selected (e.g., the position M1) (step S3). Each of the positions M1–M5 may correspond to a plurality of scanning lines. In step S4, the communication mode (e.g., GII or GIII) is set. Step S5 checks whether a paper sheet exists or not. If not, the process jumps to step S16 after displaying an error message. When a paper sheet exists, image signals for the first page are transmitted from the sending apparatus, and temporarily stored in the RAM 3 (step S6). The image signals for one scanning line which are stored in the RAM 3 are read, and the images corresponding to the signals are printed on the paper sheet by the printer 4 (step S7).

If the index mark position which has been selected in step S3 is not in the present scanning line (hereinafter "the present line"), the process jumps from step S8 to step S12, and repeats steps S6–S8 and S12 to print images of this page line by line on the paper sheet in the usual manner (i.e., the present line proceeds gradually from the top of the paper sheet to the bottom thereof). When the index mark position starts to exist in the present line, steps S9–S11 are executed. In step S9, the index mark stored in the index generator 6 is read, and in step S10 the logical OR between the image signals of the present line and the index mark is carried out to obtain composite image signals bearing the index mark. The images of the present line obtained from the composiee image signals are printed on the paper sheet (step S10). When the communication number is zero (i.e., 5n (n=0)), for example, the index mark is printed at the position M1 as shown in FIG. 3A. If there exist images in the lines following the present line, the process returns from step 12 to step S6, and repeats the steps of printing images until all images for the first page are printed.

When the printing procedure of the first page has been completed, the process proceeds to step S13 to check if the printed page is the last page (or the EOP (End of Procedure) signal is received). If the EOP signal is not received (or the MPS (Multi-Page Signal) or EOM (End of Message) signal is received), the process returns to step S5 or step S4 through step S14, and the printing procedure of the succeeding page(s) is repeated until the EOP signal is received. In the example shown in FIG. 3A, second and third pages are printed.

When the EOP signal has been received in step S13, the process checks if DCN (Disconnect) signal is transmitted or not (step S15). If not, the process proceeds to step S16 after displaying an error message. If the DCN signal is transmitted, the process proceeds directly to step S16 wherein the communication number is incremented by one (i.e., the communication number becomes one). This incremented number is stored in the RAM 3 to update the communication number (step S17), and the process for this unit of communication is completed. As a result of the above-described process, three paper sheets P are output. Each of these three paper sheets P bears the index mark at the same position thereof (i.e., at the first position M1) as shown in FIG. 3A.

FIG. 3B shows paper sheets P obtained in the fourth unit of communication (i.e., the communication number is three (5n+3)). In this case, the index mark is printed at the fourth position M4 on each of the paper sheets P. Even when the paper sheets P of FIG. 3A and those of FIG. 3B are intermixed with each other, therefore, it is possible to accurately and easily distinguish the former from the latter simply by classifying the paper sheets P in accordance with the position of the index mark.

Figure 4B:
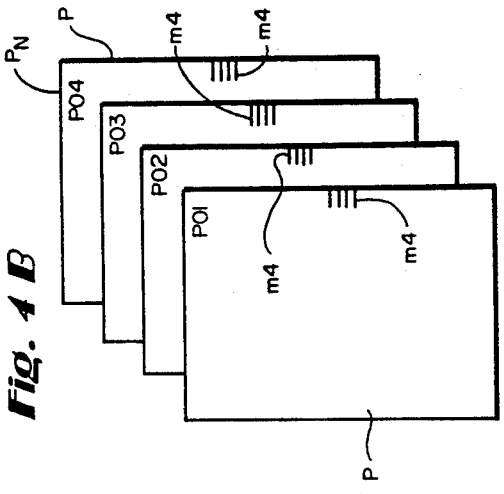
FIGS. 4A and 4B show paper sheets output by another apparatus according to the invention.
Figure 4A:
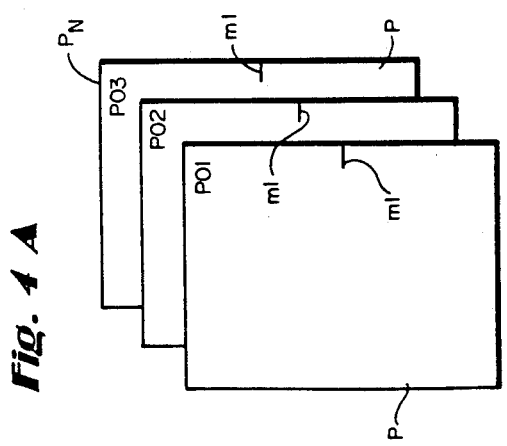
Figure 5:
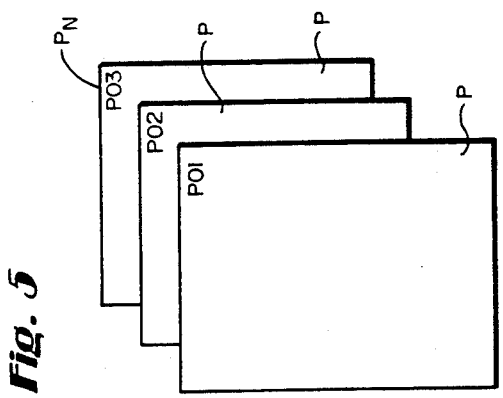
FIG. 5 shows paper sheets output by a conventional apparatus.

FIGS. 4A and 4B show paper sheets P which are output respectively in first and fourth units of communication by another apparatus according to the invention. The paper sheets P obtained in the first unit of communication have an identical index mark m1 which consists of one short bar, and those obtained in the fourth unit of communication have another identical index mark m4 which consists of four short bars. In this embodiment, the index generator 6 holds five kinds of index mark patterns which consist of one to five short bars, respectively, and one of these index patterns is selected according to the communication number. The selected index pattern is printed as an index mark at substantially the same position of paper sheets P.

According to the invention, the pattern of the index mark and the position of the index mark are not restricted to those above-described, but can be suitably selected.

It is understood that various other modifications will be apparent to and can be readily made by those skilled in the art without departing from the scope and spirit of this invention. Accordingly, it is not intended that the scope of the claims appended hereto be limited to the description as set forth herein, but rather that the claims be construed as encompassing all the features of patentable novelty that reside in the present invention, including all features that would be treated as equivalents thereof by those skilled in the art to which this invention pertains.

What is claimed is:

1. A facsimile machine for transmitting and receiving communications, comprising:
    modem means for transmitting and receiving image information;
    means for determining the beginning and end of the receipt of image information for a single communication;
    index selecting means for selecting one of a plurality of non-alphanumeric index marks upon the initial receipt of a communication as a function of a previously received different communication, said selected index mark being different than at least an index mark selected for said previously received different communication;
    means for combining said selected index mark with each page of image information received for a single communication; and
    printing means for printing each said combined page of image information and said selected index mark on a respective one of image receiving sheets, said selected index mark being printed adjacent an edge of each of the sheets.

2. A method of marking individual pages belonging to a group of pages corresponding to a single communication received by a facsimile machine, comprising the steps of:
    selecting one of a plurality of non-alphanumeric index marks upon the initial receipt of image information for a communication as a function of a previously received different communication, said selected index mark being different than at least an index mark selected for said previously received different communication;
    combining said selected index mark with each page of image information received for a single communication; and printing each said combined page of image information and said selected index mark on a respective one of image receiving sheets, said selected index mark being printed adjacent to an edge of each of the sheets.

3. A facsimile apparatus, comprising:
    a signal receiving unit for receiving image signals from other facsimile apparatuses after a completion of connection between said apparatus and one of said other facsimile apparatuses;
    an image forming unit for forming images on an image receiving sheet, said images corresponding to said received image signals;
    index generating means for selecting one of a plurality of index marks in accordance with a number of receiving operations from other facsimile apparatuses;
    index mark-position determining means for determining a position of an index mark in accordance with said number of receiving operations from the facsimile apparatuses; and
    wherein said image forming unit comprises an index mark forming means for forming said selected index mark on an image receiving sheet at the position determined by said index mark-position determining means.

4. A facsimile apparatus according to claim 3, wherein sad inner mark-position determining means determines one from a plurality of positions as said determined position.

5. A facsimile apparatus as in claim 3, wherein each said receiving operation produces at least one image to be formed on at least one of said receiving sheets and said apparatus includes means for causing said image forming unit to form said selected index mark on each receiving sheet produced in a said receiving operation.

6. A facsimile apparatus as in claim 3 wherein said selected index mark is formed along the edge of said receiving sheets.

7. A facsimile apparatus, comprising:
    a signal receiving unit for receiving image signals from other facsimile apparatuses after a completion of connection between said apparatus and one of said other facsimile apparatuses;
    an image forming unit for forming images on an image receiving sheet, said images corresponding to said received image signals;
    index mark-position determining means for determining a position of an index mark in accordance with a number of receiving operations from other facsimile apparatuses; and
    wherein said image forming unit comprises an index mark forming means for forming said index mark on an image receiving sheet at the position determined by said index mark-position determining means.

8. The method of claim 2, wherein said plurality of non-alphanumeric index marks differ by the distance each index mark is to be located from an edge of the sheet which is orthogonal to said edge on which a selected index mark is printed.

9. The method of claim 2, wherein said plurality of non-alphanumeric index marks differ by the number of lines in a pattern.

* * * * *